Figure 2A:
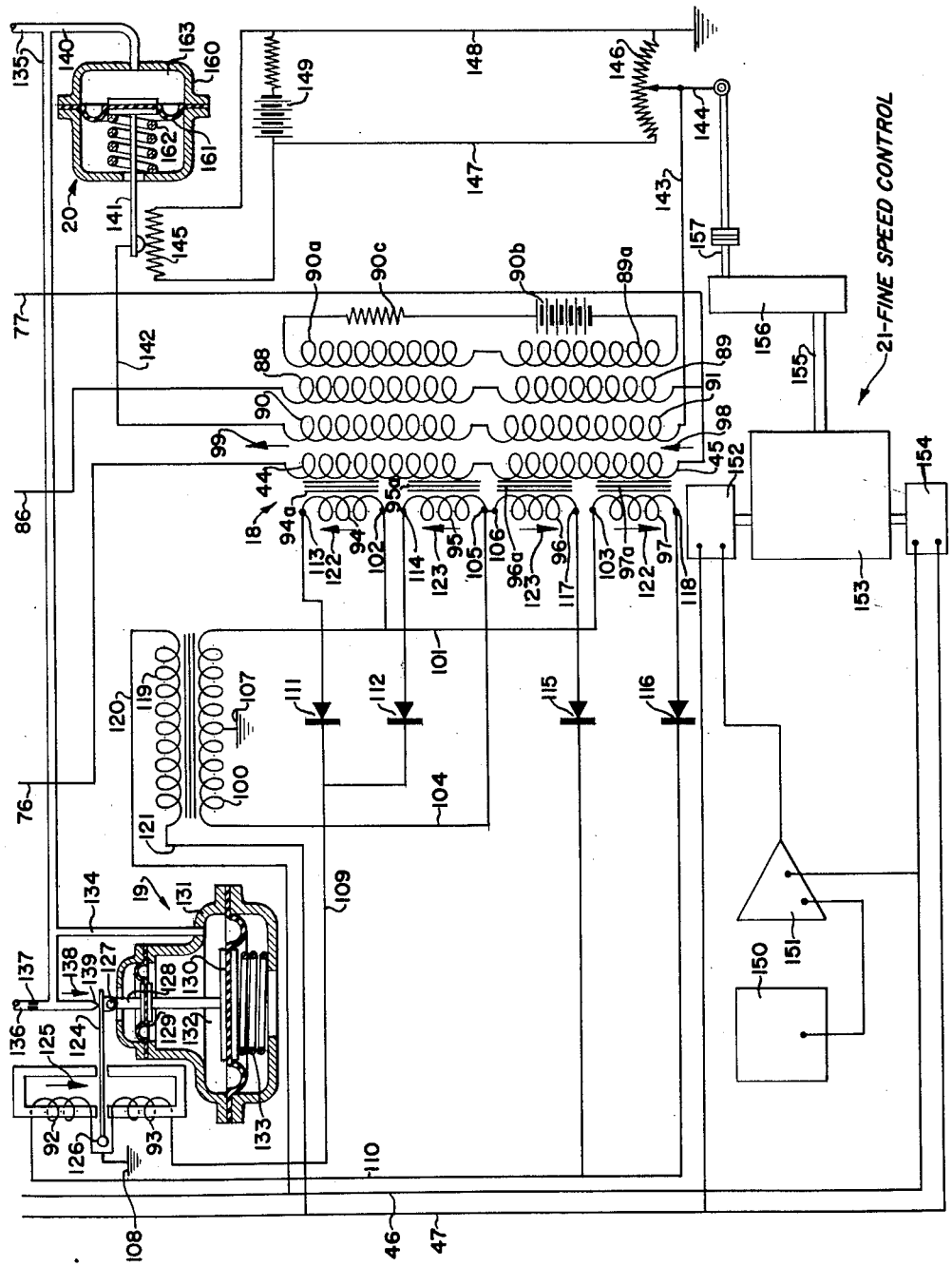

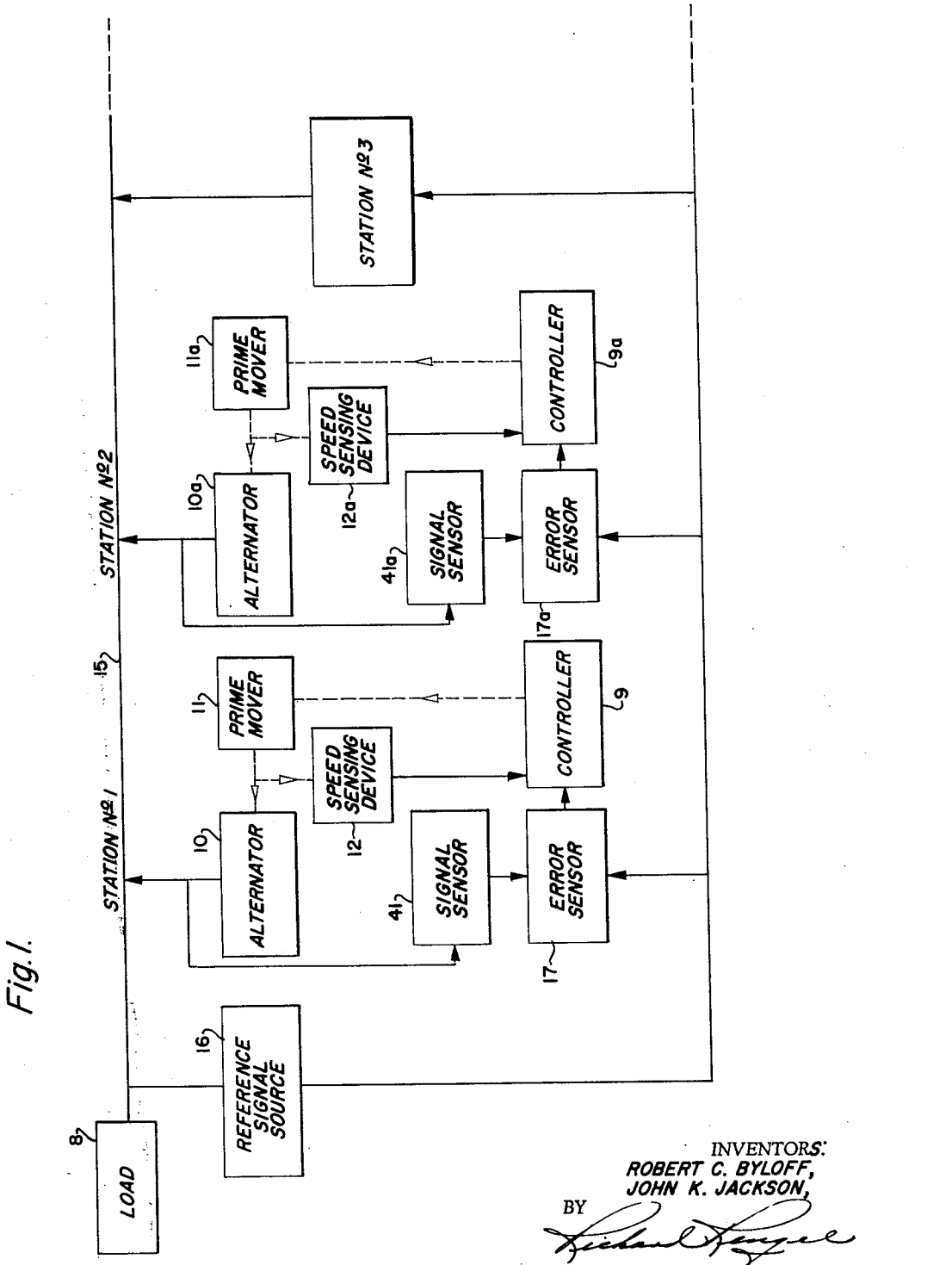
Fig. 1.
INVENTORS:
ROBERT C. BYLOFF,
JOHN K. JACKSON,
BY
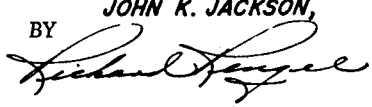
Attorney.

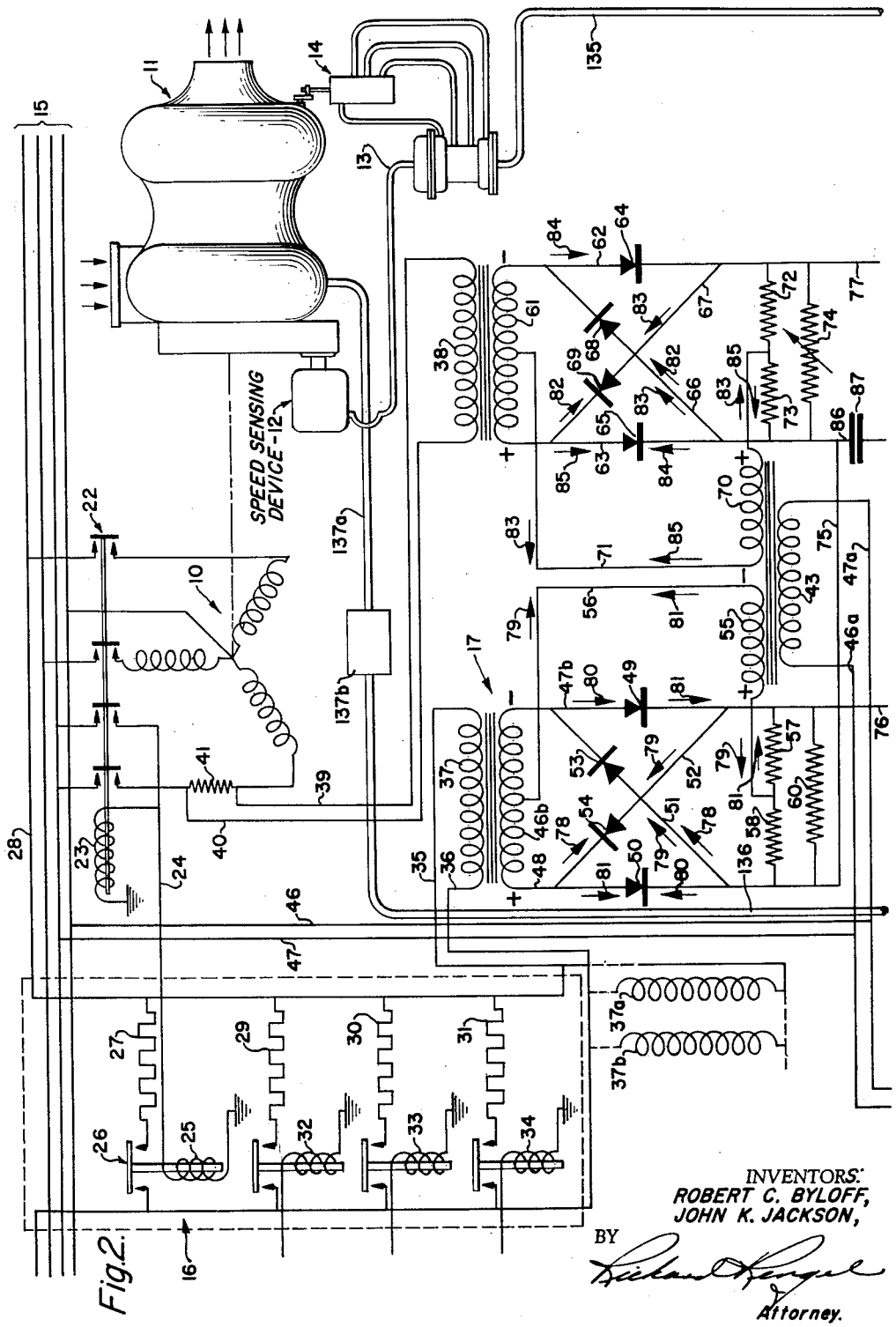

United States Patent Office 3,067,334
Patented Dec. 4, 1962

3,067,334
DRIVING AND CONTROL MEANS FOR A PLURALITY OF ALTERNATORS
Robert C. Byloff, Los Angeles, Calif., and John K. Jackson, Phoenix, Ariz., assignors to The Garrett Corporation, Los Angeles, Calif., a corporation of California
Continuation of application Ser. No. 626,434, Dec. 4, 1956. This application Mar. 13, 1959, Ser. No. 799,288
18 Claims. (Cl. 290—4)

The present invention relates to a control means for a plurality of alternators, each driven by an independent prime mover, and more particularly to a control means which maintains an equal division of load between several alternators in parallel, while controlling the speed of each alternator within very close tolerances, thereby attaining a precise frequency and phase relationship of each of the alternators with respect to the other alternators in circuit therewith.

This application is a continuation of our pending application Serial No. 626,434, filed December 4, 1956, now abandoned, for Driving and Control Means for a Plurality of Alternators.

In the operation of several alternators connected to a common bus and thereby intended to share a common load, it is desirable to control the independent prime movers of the alternators in such a manner that torque thereof, imparted to the alternators, will automatically be increased or decreased in response to changes in the bus load, so that a desired frequency will be maintained and each alternator will carry its proportional share of the common load.

Accordingly, it is an object of the invention to provide an alternator controlling means which will maintain equal load sharing and parallel operation of a plurality of alternators precisely at a desired frequency.

Another object of the invention is to provide a novel combination of an alternator load sensing device with a precise alternator speed responsive device and an amplifier, whereby signals applied to the amplifier from the load sensing device and the speed responsive device cause the amplifier to deliver signals which modulate the torque of a prime mover driving an alternator, and in addition a feedback signal influenced by both the load sensing device and the speed responsive device is also applied to the amplifier, in order to prevent hunting or oscillation of the prime mover in response to a load change.

Another object of the invention is to provide an alternator paralleling and fine speed control which is particularly adapted for use in the operation of turbine driven alternators.

A further object of the invention is to provide an alternator paralleling and fine speed control comprising a novel co-operation of pneumatic and electrical equipment for use in controlling the operation of a turbine driven alternator.

An additional object of the invention is to provide an alternator control wherein an electrical load sensing means, coupled to the alternator, delivers signals to an amplifier, which modulates a pneumatic device disposed to govern a prime mover driving the alternator.

Other objects and advantages of the invention may be apparent from the following specification, appended claims and accompanying drawings.

FIG. 1 is a block diagram of a preferred embodiment of the invention.

FIGS. 2 and 2A form a diagrammatic illustration of reference signal source and one station of the preferred embodiment shown in FIG. 1 including driving and control means for a plurality of alternators.

Referring now to the drawings, wherein like reference characters designate like or corresponding parts throughout the several views, there is shown in FIG. 1, which illustrates a preferred embodiment of the invention, a load distribution system including alternator stations 1, 2 and 3 to which any additional stations which may be found desirable may be added. Each station includes an alternator 10 driven by a prime mover 11 which is controlled by a controller 9. The load distribution system includes a control arrangement for regulating the load supplied by the alternator of each station to a predetermined function of the load supplied by the distribution system to a common load 8 which is supplied by all of the stations of the distribution system. In the preferred arrangement, the load supplied by each alternator is regulated to produce an equal division of the common load between them. Also, the speed of each alternator is controlled within very close tolerances to produce a precise frequency and phase relationship between alternators connected to a common bus 15 by a feedback control arrangement including a speed sensing device 12 connected to the prime mover and the controller.

A signal sensor 41 and an error sensor 17 are provided for the alternator of each station. The signal sensor 41 provides an alternator signal which is a function of the actual load supplied by the respective alternator. The alternator signal is coupled to the error sensor 17 where it is combined with a reference signal produced by a reference signal source 16. The reference signal source 16 may consist of a shunt circuit device producing a reference signal which is a function of the load supplied by the system and the number of alternators connected onto the common bus. The reference signal is combined with the alternator signal in the error sensor to produce a composite error control signal which is coupled to the controller. The controller is responsive to the composite error signal to actuate a control on the prime mover to regulate the torque coupled to the alternator. Thus, the alternator output is regulated to a predetermined level which is determined by the reference signal supplied by the reference signal source.

The present invention, as shown in FIGS. 2 and 2A of the drawings, relates to the control of two or more alternators. In these figures, a complete circuit is shown for only one alternator, while a bus and a shunt device are shown as common to four alternators. Each alternator connected to the bus employs all of the circuit shown in FIGS. 2 and 2A.

Referring now to FIGS. 2 and 2A for a more detailed description of the circuit and apparatus of each station and the reference source, each alternator 10 is shown to be driven by a prime mover 11, controlled by a governor system, including a speed sensing device 12, servomechanism 13, and a governor actuator 14. This speed sensing and governor system forms no part of the present invention, however, pneumatic signals from the control means of the present invention are received by the governor system, as will be hereinafter described in detail.

By way of example, the prime mover 11 may be a turbine, the output torque and speed of which may be controlled by a variable area nozzle or a throttle connected to the governor actuator 14.

The alternator 10, under desired conditions, is driven by the prime mover 11, so that it operates in phase with other alternators connected to the bus 15 which have similar characteristics; and carries its proportional share of the load in connection with the bus 15. Each alternator when connected to the bus, activates a corresponding element of the reference signal source or shunt device 16, which delivers current to the error sensing circuit 17 in proportion to the number of alternators sharing a load in connection with the bus 15. For example, when only two alternators are sharing a load, the shunt delivers current proportional to one-half of the load, to the error sensing circuit 17.

Current which is proportional to the actual load being carried by the alternator 10 is also delivered to the error sensing circuit. This circuit is then electrically balanced or unbalanced, according to the load being carried by the alternator 10, as compared to its share of the total load. If the alternator is carrying more or less than its share of the total load connector to the bus 15, the circuit 17 becomes unbalanced and delivers a control signal current to the controller including a magnetic amplifier 18; the polarity of such current corresponding to the underloaded or overloaded condition of the alternator 10.

The magnetic amplifier 18 responds to the current signal received from the circuit 17, and correspondingly energizes an electropneumatic regulator 19, which acts to modulate the pneumatic pressure communicating with the servomechanism 13. This servomechanism responds to the modulation of pneumatic pressure and effects an adjustment of the governor actuator 14, which in turn controls the turbine nozzles or throttle, in order to change the torque of the turbine corresponding to either an increase, or decrease, to enable the alternator 10 to carry its proportional share of the load.

When the pneumatic pressure is modulated by the electropneumatic regulator 19, a pneumatic electrical transducer 20 senses the modulated pressure and delivers a feedback signal to the magnetic amplifier 18. This feedback signal is of minor magnitude and opposes the signal delivered to the magnetic amplifier 18 by the error sensing circuit 17. The feedblock signal thus tends to prevent the magnetic amplifier 18 and electropneumatic regulator 19 from over-modulating control pressure delivered to the governor actuator 14. The transducer 20 thus tends to prevent hunting of the prime mover control system.

While the transducer 20 serves to deliver feedback signals to the magnetic amplifier 18 resulting from activity, induced by the error sensing circuit 17, the transducer also delivers feedback signals to the magnetic amplifier 18, following operation of the magnetic amplifier 18 induced by a fine speed control device 21. A fine speed control suitable for this purpose is shown in our co-pending patent application, Serial No. 543,156, entitled, "Fine Speed Control," filed October 27, 1955, which is incorporated by reference. This fine speed control device is responsive to the cycle rate of the alternator 10, and operates to deliver corrective electrical signals to the magnetic amplifier 18, according to extremely slight variations in speed of the alternator 10 and prime mover 11, with respect to a desired speed.

It will be understood that the present invention controls the prime mover 11 to drive the alternator 10 according to load and speed of the alternator sensed by the circuit 17 and fine speed control device 21, respectively. It will be further understood that the transducer 20 co-operates in a novel way with the error sensing circuit 17 and the fine speed control device 21 to deliver a feedback signal to the magnetic amplifier 18 following activation thereof by the error sensing circuit 17 and/or the fine speed control 21.

Having generally described the invention, a detailed description of the various circuits shown in the drawings follows:

As shown in the drawings, the shunt circuit of the present invention includes shunt elements for four alternators connected in parallel with the bus 15. As shown in FIG. 2, however, complete circuits for only the alternator 10 are disclosed. Each alternator, including the alternator 10, requires a conventional paralleling device and voltage regulating apparatus for connecting it to the bus 15, and for equalizing reactive power during parallel operation of the alternator when they are in phase with each other. Accordingly, a contactor 22 is provided to couple the leads of the alternator 10 to the bus 15 as soon as the alternator 10 is in phase with other alternators connected to the bus 15.

The contactor 22 is operated by a conventional alternator paralleling device not shown, and which forms no part of the present invention. This conventional alternator paralleling device is adapted to energize a solenoid 23, which operates the contactor 22, and also energizes a solenoid 25 by means of a conductor 24. The solenoid 25 in turn closes a switch 26, energizing one element 27 of the shunt circuit 16. Closing of the switch 26 couples the shunt element 27 in series in a line 28 of the bus 15, which is common to all of the alternators controlled by the present invention. Additional shunt elements 29, 30, and 31 for three additional alternators are connected in parallel with the shunt 27 in the line 28 of the bus 15. The shunt elements 29, 30 and 31 are operable by means of solenoids 32, 33 and 34 which close switches similar to switch 26. The solenoids 32, 33 and 34 are energized in a similar manner to the solenoid 25, when additional alternators are coupled to the bus 15 in a manner similar to that of the alternator 10. The shunt elements 27, 29, 30 and 31 are conected in parallel with a primary winding 37 of a load transformer of the error sensing circuit 17 by means of leads 35 and 36. Additional primary windings 37a and 37b which have been provided for other alternator stations are shown connected in parallel with winding 37. It will be understood that current flowing through the line 28 of the bus 15 will be divided by the shunt elements 27, 29, 30 and 31, in accordance with the number of these elements which are coupled in parallel with the windings 37, 37a and 37b. As previously described, the shunt circuit 16 provides a voltage difference across the windings 37, 37a and 37b in proportion to current flowing in line 28 and inversely proportional to the number of alternators coupled to the bus 15. For example, if two alternators are coupled to the bus 15, current proportional to half of the load carried by the bus will be delivered to the winding 37. Such current, conducted to the winding 37, should, therefore, be equaled by the current conducted to a primary winding 38 of an alternator transformer. The winding 38 is connected to a signal current sensing element 41 by means of leads 39 and 40. The signal current sensing element 41 in turn is coupled to one lead of the alternator 10.

The error sensing circuit 17 also employs a polarizing transformer having a primary winding 43 which is connected by means of conductors 46a and 47a to conductors 46 and 47, respectively. The conductors 46 and 47 in turn are connected to two conductors of the bus 15, thus energizing the polarizing transformer directly from the main bus. This results in a greater current flow in the winding 43 than flowing through the windings 37 and 38 of the load and alternator transformers, respectively.

As hereinbefore described, the signal current supplied to the winding 37 serves as a reference with respect to the current supplied to the winding 38. Thus, any variations between the output of the alternator 10, and the load sensed by the shunt device 16, causes the error sensing circuit 17 to deliver a composite error signal to control windings 44 and 45 of the magnetic amplifier 18. Essentially, the error sensing circuit 17 must be unbalanced with respect to the current passing through the winding 38 and that passing through the winding 37, in order to effect the flow of current through the control windings 44 and 45 of the magnetic amplifier 18.

The winding 37 is disposed to induce the flow of current in a secondary winding 46b having leads 47b and 48 at opposite ends. The leads 47b and 48 are connected to rectifying elements 49 and 50, respectively. These rectifiers conduct freely in one direction and normally prevent the flow of current in the opposite direction. An unlocking current of relatively large magnitude is applied to the rectifiers from a secondary winding 55 of the polarizing transformer and a signal current of small magnitude is superimposed on the unlocking current by the load transformer. The relative magnitude of the unlocking current and the signal current are chosen so that the flow of unlocking current establishes the direction of potential across the rectifiers 49 and 50. The unlocking current thus determines which of the rectifiers are conducting, while the signal current is a relatively small variation superimposed upon this unlocking current, and therefore has essentially no effect upon state of conduction or non-conduction of the rectifiers.

The primary winding 43 of the polarizing transformer is disposed to induce current to flow in a secondary winding 55, one end of which is connected to a conductor 56 coupled to a center tap of the secondary winding 46b of the load transformer. The opposite end of the winding 55 is connected between a pair of resistors 57 and 58, which are connected in series and abridge the conductors 47b and 48. The resistors 57 and 58 should be of substantially equal value. A resistor 60, which is connected in parallel with the resistors 57 and 58 also abridges the conductors 47b and 48 in order to complete a circuit with the secondary winding 46b, the operation of which will be hereinafter described.

The arrangement of the circuit, whereby the unlocking current is introduced at a center tap on the secondary winding 46b of the load transformer or between two resistors 57 and 58, results in a voltage drop across a resistor 60, which is dependent only on that portion of the signal current passed by the rectifying circuit and independent of the unlocking current flow. Interconnecting the conductors 47b and 48 are crossed conductors 51 and 52, having rectified elements 53 and 54 connected therein. These rectifiers are characteristically similar to rectifiers 49 and 50. The above-described error sensing circuit thus acts as a rectifying circuit to rectify the alternating current to a pulsating direct current.

The primary winding 38 of the alternator transformer is disposed to induce a flow of current into a secondary winding 61 of the alternator transformer, the opposite ends of which are connected to conductors 62 and 63. The conductors 62 and 63 are connected to rectifying elements 64 and 65, respectively. These rectifiers are similar in structure and operation to the rectifiers 49 and 50 previously described. Crossed conductors 66 and 67 interconnect the conductors 62 and 63 and are provided with rectifying elements 68 and 69 respectively, which are also similar to the previously described rectifiers 49 and 50. The primary winding 43 of the polarizing transformer is disposed to induce current to flow in a second secondary winding 70, one end of which is connected by a conductor 71 to a center tap on the secondary winding 61 of the alternator transformer. The opposite end of the winding 70 is connected between a pair of substantially equal resistors, 72 and 73, which are connected in series and abridge the conductors 62 and 63. A variable resistor 74 interconnects the conductors 62 and 63 and is connected in parallel with the resistors 72 and 73. The resistor 74 is made variable only for the purpose of calibrating the error sensing circuit 17. It will be understood that operation of the rectifying circuit including the transformer windings 38 and 70 is similar to that of the previously described circuit employing the transformer windings 37 and 55. A conductor 75 interconnects the lower ends of conductors 48 and 63, while conductors 76 and 77, which are connected to the conductors 47b and 62 respectively, are coupled to the series connected control windings 44 and 45 of the magnetic amplifier 18.

In operation of the error sensing circuit 17, alternating current flows through the primary windings 37, 38 and 43 of the load, alternator and polarizing transformers, respectively. Arrows 79 indicate the direction of unlocking current flow from the secondary winding 55 through the rectifying circuit during the portion of the cycle in which the polarity across the polarizing transformer is as shown. The direction of signal current flow is shown by arrows 78 for the corresponding condition in which the polarity of the load transformer is as indicated. Since the system need not operate under conditions in which the current and voltage are exactly in phase, the indicated polarity of the load and polarizing transformers need not exist at the same instant, but they may be of opposite polarity for some fraction of an alternator cycle. In the event that the polarity of the load transformer is opposite to that shown, and the direction of arrows 79 still indicates the flow of unlocking current, the signal current will be along the same path but of opposite direction than indicated by arrows 78. The effect is thus to reduce the average voltage across resistor 60, due to the difference in phase between signals applied to the load and polarizing transformers. A detailed examination of this circuit will reveal that this average voltage reduction is in exact proportion to compensate for operation of the alternator at reduced power factors and that the circuit is thereby sensitive to real power in watts, as given by the expression $P=EI \cos \phi$ in which $\phi$ is the phase angle between voltage E and current I.

The flow of current through the rectifier circuit, when the polarity of the polarizing transformer is reversed is shown by arrows 80 and 81 for the direction of the signal current and unlocking current, respectively. Thus, arrows 78 and 79 represent the directions of the signal and unlocking currents flowing in circuit during one half cycle of alternating current. Arrows 80 and 81 represent the directions of the current flow in circuit during each alternate half cycle of alternating current. Thus, it can easily be seen that the lead 76 is always positive with respect to the lead 75, regardless of which half cycle of current is flowing through the transformer windings.

Arrows 82 and 83 indicate the directions of current flow in the other portion of the circuit including the windings 61 and 70 during each initial half cycle of alternating current induced by the primary windings 38 and 43 of the alternator and polarizing transformers, respectively. Arrows 84 and 85 indicate the direction of current flowing in this circuit during each alternate half cycle of alternating current. Thus, the lead 77 will always be positive with respect to lead 86, regardless of the current direction.

It will also be understood that when the error sensing circuit 17 is balanced, the voltage potential between conductors 63 and 47b equals the potential between conductors 63 and 62; thus no current will flow through the control windings 44 and 45 of the magnetic amplifier 18. If, however, output of the alternator 10 increases or decreases, the error sensing circuit 17 becomes unbalanced and current will flow through the control windings 44 and 45 in a direction corresponding to either the increase or decrease of the alternator output.

The conductor 86 is coupled to a capacitor 87 in circuit with magnetic amplifier control windings 88 and 89 disposed in series with each other and in circuit with the conductor 77. The capacitor is arranged to conduct only in response to a load change in connection with the alternator 10, which is sensed by the error sensing circuit 17. Thus, this capacitor 87 only provides an electrical signal to the magnetic amplifier control windings 88 and 89 during such a load change in connection with alternator 10. A characteristic function of the capacitor 87 is a substantially maximum instantaneous conduction of current followed by a decay in magnitude of such current.

The purpose of the capacitor 87, in circuit with the control windings 88 and 89, is to provide a substantially maximum instantaneous control signal to the magnetic amplifier 18 which is combined with a signal passing through the control windings 44 and 45. Thus, the combined flow of current or signal energy passing through the control windings 44, 45, 88 and 89 is gradually reduced during the delivery of a signal from the error sensing circuit 17, due to the decaying characteristics of the current initially delivered by the capacitor 87. The capacitor 87, coupled with the control windings 88 and 89, thus serves as a load change anticipating arrangement to increase the response of the control system and thereby improve performance thereof.

In addition to the control windings 44, 45, 88 and 89, the magnetic amplifier 18 is also provided with control windings 90 and 91, which are in circuit with the pneumatic electrical transducer 20 and the fine speed control 21, as will be hereinafter described in detail. The control windings 44, 45, 88, 89, 90 and 91, when energized, induce current to flow in the magnetic amplifier circuit, in order to energize electromagnets 92 and 93 of the electropneumatic regulator 19.

Referring to FIG. 2 of the drawings, and particularly to the arrows 78 and 80 adjacent to the resistor 60, and to the arrows 82 and 84 adjacent to the resistor 74, it will be seen that under any condition of unbalance of the error sensing circuit 17, alternating current is rectified to pulsating direct current, and will flow through the control windings 44 and 45 of the magnetic amplifier 18, in the same direction during a complete cycle of alternating current received by error sensing circuit 17. From this it will be understood that the error sensing circuit 17, when unbalanced, delivers pulsating direct current to the control windings 44 and 45. Assuming that the alternator 10 is carrying more than its share of the load, the input to the winding 38 of alternating transformer will exceed the input to the winding 37 of the load transformer. Consequently, the circuit 17 will be unbalanced and current will flow from the conductor 77 through the control windings 45 and 44 of the magnetic amplifier 18 to the conductor 47b in connection with the load transformer.

As shown in FIG. 2A of the drawings, arrows 98 and 99 indicate current flowing through the control windings 44 and 45 in a direction from the conductor 77 to the conductor 76, which indicates an overload carried by the alternator 10. The control windings 44 and 45 induce current to flow in secondary windings 94 and 95 and secondary windings 96 and 97 of the magnetic amplifier. The magnitude of current flowing through the windings 44 and 45 affects the flux density of cores 94a, 95a, 96a and 97a so that an increase of current flowing through the control windings 44 and 45 increases the flux level of cores 94a, 95a, 96a and 97a, the impedance values of the windings 94, 95, 96 and 97 are correspondingly decreased, and therefore an increase of current flowing through the control windings 44 and 45 in one direction causes the windings 94 and 95 to permit an increase in the flow of current through themselves depending on the direction of current passing through the control windings 44 and 45.

One end 113 of the winding 94 is connected to a rectifying element 111 while one end 114 of winding 95 is connected to another rectifying element 112. The output of the two rectifying elements 111 and 112 is connected together and a common lead 109 connects the output of the rectifying elements with an electromagnet 93. One end 117 of the winding 96 is connected to a rectifying element 115 while one end 118 of the winding 97 is connected to a rectifying element 116. The outputs from the two rectifying elements 115 and 116 are connected together, and a common lead 110 connects the output to another electromagnet 92. The other leads from the two electromagnets 92 and 93 are connected to a common ground 108.

One lead of a secondary winding 100 of a power transformer is connected to the other ends 102 and 103 of the windings 94 and 97, respectively, by means of a lead 101. The other end of the primary winding 100 is connected to the other ends 105 and 106 of the windings 95 and 96, respectively, by means of a lead 104. A center tap on the secondary winding 100 is connected to a ground 107. A primary winding 119 of the power transformer is connected to the leads 46 and 47 by means of two leads 120 and 121 so that it will be energized from the main bus 15.

Arrows 122 represent the direction of current flowing in circuit with the secondary winding 100 during each initial half cycle of alternating current induced in the secondary winding 100 by the primary winding 119. Arrows 123 represent the direction of current flowing in circuit with winding 100 during each alternate one-half cycle of alternating current induced in the secondary winding 100 by the primary winding 119. By means of the rectifiers 111 and 112, the alternating current is rectified into pulsating direct current communicating with the electromagnet 93, through the conductor 109. Likewise, rectifiers 115 and 116 rectify the alternating current so that pulsating direct current is supplied through the conductor 110 to the electromagnet 92. It will be noted that current flowing in windings 96 and 97 of the magnetic amplifier is in one direction, while current flowing in windings 94 and 95 is in the opposite direction. The circuit of the magnetic amplifier is so designed that the windings 94, 95, 96 and 97 may be energized to substantially 100 percent of alternating current saturation by normal induction of current from the primary winding 119 to the secondary winding 100 of the power transformer. The amplifier is provided with a direct current bias derived from any desired source, such as battery 90b and resistor 90c and supplied to bias windings 89a and 90a. The value of the bias current is such that with zero control current, the amplifier will deliver approximately forty percent of full output current to the electromagnets 92 and 93. When, for example, current flows through the control windings 44 and 45 in the direction as indicated by the arrows 98 and 99, current influenced by the windings 94 and 95 from the control winding 44, tends to increase the saturation level of the cores 94a and 95a, whereby a porportional decrease of impedance in windings 94 and 95 takes place. Under these conditions the windings 94 and 95 permit an increased flow of current into the conductor 109 and to the electromagnet 93. At the same time, current flowing in the control winding 45 in the direction as indicated by arrows 98 and 99, is opposite to that flowing in the windings 96 and 97, whereby the flux level of cores 96a and 97a is reduced, which increases the impedance of windings 96 and 97 and reduces the amount of current flowing therethrough to the conductor 110 and electromagnet 92. It will be seen that while the electromagnet 93 is increasingly energized, the electromagnet 92 is proportionately de-energized, which causes a force to be exerted upon a modulating bar 124 of the electropneumatic regulator 19 in a direction as indicated by an arrow 125.

When an unbalance of this circuit is caused by an over-load of the alternator 10, pulsating direct current flows through the control windings 44 and 45 in the direction of arrows 98 and 99. When the alternator 10 is not carrying its share of the load, the error sensing circuit 17 becomes unbalanced, as hereinbefore described, causing pulsating direct current to flow in a direction opposite to arrows 98 and 99. The current flowing in windings 96 and 97 of the magnetic amplifier will be increased because of their reduced impedance, while the current flowing in windings 94 and 95 will decrease because of their increased impedance, thereby increasing the energization of electromagnet 92 and decreasing energization of electromagnet 93. Since the design of the magnetic amplifier circuits normally provides for substantially forty percent of maximum energization of the electromagnets 92 and 93, each may be increasingly energized or de-energized according to the magnitude of control signals received by control windings of the magnetic amplifier.

Referring to FIG. 2A of the drawings, it will be seen that the bar 124 of the electro-pneumatic regulator 19 is provided with a fixed pivot 126 at one end and is pivotally connected at its opposite end by means of a pin 127 to a rod 128, which is secured to diaphragms 129 and 130. The electromagnets 92 and 93 are disposed laterally of the axis of the pivot 126, in order to exert force on the bar 124, causing it to move about the fixed pivot 126. The diaphragms 129 and 130 are supported in a housing 131, defining a chamber 132 between the diaphragms 129 and 130. The diaphragm 129 is smaller than the diaphragm 130 and provides a seal around the rod 128 to form one wall of the chamber 132. The diaphragm 130 is exposed to ambient pressure in opposition to the pressure in the chamber 132, and a spring 133 tends to force the diaphragm 130 toward the chamber 132 in opposition to pressure therein. Communicating with the chamber 132 is a tube 134 connected to a conduit 135, which communicates with a conduit 136 having a restricted orifice 137 therein. The conduit 136 is provided with a supply of fluid under pressure from any desired source such as the compressor of the turbine 11 via a conduit 137a and pressure regulator 137b, as indicated by an arrow 138. Downstream of the orifice 137, an orifice 139 is variable by movement of the bar 124, which is disposed in close proximity to said orifice 139, and permits escape of the controlled pressure fluid to ambient atmosphere, thereby modulating pressure downstream of the orifice 137. Pressure downstream of the orifice 137 is conducted into the chamber 132 by means of the tube 134, whereby movement of the bar 124 away from the orifice 139 reduces pressure in the tube 134 and chamber 132. Such a reduction in pressure is reacted against by the spring 133; thus the diaphragm and spring function as a feedback pressure regulator, responsive to forces exerted upon the bar 124 by the electromagnets 92 and 93. Thus, net fluid pressure changes in the conduit 135 result from influences of the magnetic amplifier 18 on the electropneumatic regulator 19.

Changes of pressure in the conduit 135 are concurrently sensed by the servomechanism 13 of the prime mover governor and the pneumatic electrical transducer 20. This transducer operates as a feedback device, tending to prevent an overshoot of the pneumatic pressure change in the conduit 135 communicating with the servomechanism 13. The transducer 20 is provided with a housing 160, divided into two chambers by a diaphragm 161. The diaphragm 161 is engaged by a spring 162 in one chamber which opposes pressure in the other chamber 163. The chamber 163 is connected to fluid pressure in the conduit 135 by a branch tube 140 while the chamber containing the spring 162 is exposed to ambient pressure. Connected to the diaphragm 161 is a potentiometer traversing arm 141, having a conductor 142 electrically connected to the magnetic amplifier control windings 90 and 91. Also in circuit with the control windings 90 and 91 is a conductor 143, connected to a potentiometer traversing arm 144 actuated by the fine speed control 21 disclosed in our co-pending application. The traversing arms 141 and 144 co-operate with variable resistances 145 and 146 of a potentiometer bridge similar to that as shown in the above application. This potentiometer bridge includes conductors 147 and 148 interconnecting the ends of the potentiometers 145 and 146. A battery 149 or other source of direct current is connected across the conductors 147 and 148 in order to energize the variable resistances 145 and 146.

While the transducer 20 is in circuit with the potentiometer bridge of the fine speed control 21, it is capable of providing a feedback signal to the control windings 90 and 91 which is responsive to any pressure change in the conduit 135, whether the pressure change be initiated by error sensing circuit 17 or the fine speed control 21. Both the error sensing circuit 17 and the fine speed control 21 can initiate operation of the magnetic amplifier 18 to actuate the electropneumatic regulator 19. The fine speed control 21, as disclosed in the above-mentioned application, includes a resonating device 150 coupled to an amplifier 151, which controls a synchronous motor 152. The synchronous motor drives one element of a computing differential 153 while a second synchronous motor 154, operating in accordance with the output frequency of the alternator 10, drives the other element. Thus, any variation in output frequency of the alternator 10 is reflected in the speed of the synchronous motor 154. which drives one element of the computing differential 153 in opposition to that driven by the synchronous motor 152 operating at a precise reference cycle rate. The computing differential is provided with an output shaft 155, driving a reduction gear train 156, having an output shaft 157, which actuates the potentiometer traversing arm 144.

It will be understood that various modifications of the present invention may be resorted to in a manner limited only by a just interpretation of the following claims.

We claim:

1. In an alternator control means the combination of: a common bus; a plurality of alternators; a prime mover for and connected to drive each of said alternators, a governor driven by and controlling each prime mover; switch means connected to couple each of said alternators to said bus; a load sensing means coupled to said bus for deriving a reference signal in response to the number of alternators contributing to the current flowing in said bus; an alternator sensing means for and connected to each alternator for deriving a signal indicating the output thereof; a comparing means connected to said load sensing means and to said alternator sensing means for comparing said reference signal and said alternator signal, said comparing means in addition being connected to deliver a control signal proportional to the difference between said reference signal and said alternator signal to an amplifier; governor control means for each prime mover coupled to said amplifier and connected to control the governor of said prime mover; and signal producing means responsive to said governor control means and connected to provide a feedback signal to said amplifier.

2. In an alternator control means the combination of: a common bus; a plurality of alternators; a prime mover for and connected to drive each of said alternators, a governor driven by and controlling each prime mover; switch means connected to couple each of said alternators to said bus; a load sensing means coupled to said bus for deriving a reference signal in response to the number of alternators contributing to the current flowing in said bus; an alternator sensing means for and connected to each alternator for deriving a signal indicating the output thereof; a comparing means connected to said load sensing means and to said alternator sensing means for comparing said reference signal and said alternator signal, said comparing means in addition being connected to deliver a control signal proportional to the difference between said reference signal and said alternator signal to an amplifier; governor control means for each prime mover coupled to said amplifier and connected to control the governor of said prime mover.

3. In an alternator control means the combination of: a common bus; a plurality of alternators; a prime mover for and connected to drive each of said alternators, a governor driven by and controlling each prime mover; switch means connected to couple each of said alternators to said bus; a load sensing means coupled to said bus for deriving a reference signal in response to the number of alternators contributing to the current flowing in said bus; an alternator sensing means for and connected to each alternator for deriving a signal indicating the output thereof; a comparing means connected to said load sensing means and to said alternator sensing means for comparing said reference signal and said alternator signal, said comparing means in addition being connected to deliver a control signal proportional to the difference between said reference signal and said alternator signal to an amplifier; governor control means for each prime mover coupled to said amplifier and connected to control the governor of said prime mover; and speed control means actuated by the speed of said prime mover and connected to deliver an additional control signal to said amplifier.

4. In an alternator control means the combination of: a common bus; a plurality of alternators; a prime mover for and connected to drive each of said alternators, a governor driven by and controlling each prime mover; switch means connected to couple each of said alternators to said bus; a load sensing means coupled to said bus for deriving a reference signal in response to the number of alternators contributing to the current flowing in said bus; an alternator sensing means for and connected to each alternator for deriving a signal indicating the output thereof; a comparing means connected to said load sensing means and to said alternator sensing means for comparing said reference signal and said alternator signal, said comparing means in addition being connected to deliver a control signal proportional to the difference between said reference signal and said alternator signal to an amplifier; governor control means for each prime mover coupled to said amplifier and connected to control the governor of said prime mover; signal producing means responsive to said governor control means and connected to provide a feedback signal to said amplifier; and speed control means actuated by the speed of said prime mover and connected to deliver an additional control signal to said amplifier.

5. In an alternator control means the combination of: a common bus; a plurality of alternators; a prime mover for and connected to drive each of said alternators, a governor driven by and controlling each prime mover; switch means connected to couple each of said alternators to said bus; a load sensing means coupled to said bus for deriving a reference signal in response to the number of alternators contributing to the current flowing in said bus; an alternator sensing means for and connected to each alternator for deriving a signal indicating the output thereof; a comparing means connected to said load sensing means and to said alternator sensing means for comparing said reference signal and said alternator signal, said comparing means in addition being connected to deliver a control signal proportional to the difference between said reference signal and said alternator signal to an amplifier; governor control means for each prime mover coupled to said amplifier and connected to control the governor of said prime mover; a valve for each prime mover connected to modulate the fluid pressure in a fluid supply line; said modulated fluid pressure controlling the governor of said prime mover and the operation of said valve being controlled by the output of said amplifier.

6. In an alternator control means the combination of: a common bus; a plurality of alternators; a prime mover for and connected to drive each of said alternators, a governor driven by and controlling each prime mover; switch means connected to couple each of said alternators to said bus; a load sensing means coupled to said bus for deriving a reference signal in response to the number of alternators contributing to the current flowing in said bus; an alternator sensing means for and connected to each alternator for deriving a signal indicating the output thereof; a comparing means connected to said load sensing means and to said alternator sensing means for comparing said reference signal and said alternator signal, said comparing means in addition being connected to deliver a control signal proportional to the difference between said reference signal and said alternator signal to an amplifier; governor control means for each prime mover coupled to said amplifier and connected to control the governor of said prime mover; a valve for each prime mover disposed to modulate the fluid pressure in a fluid supply line; said modulated fluid pressure controlling the governor of said prime mover and the operation of said valve being controlled by the output of said amplifier; and a pressure transducer responsive to said modulated fluid pressure and connected to provide a feedback signal to said amplifier.

7. In an alternator control means the combination of: a common bus; a plurality of alternators; a prime mover for and connected to drive each of said alternators, a governor driven by and controlling each prime mover; switch means connected to couple each of said alternators to said bus; a load sensing means coupled to said bus for deriving a reference signal in response to the number of alternators contributing to the current flowing in said bus; an alternator sensing means for and connected to each alternator for deriving a signal indicating the output thereof; a comparing means connected to said load sensing means and to said alternator sensing means for comparing said reference signal and said alternator signal, said comparing means in addition being connected to deliver a control signal proportional to the difference between said reference signal and said alternator signal to an amplifier; governor control means for each prime mover coupled to said amplifier and connected to control the governor of said prime mover; speed control means actuated by the speed of said prime mover and connected to deliver an additional control signal to said amplifier; said speed control means comprising: a reference frequency source; means connected to said reference frequency source and to said alternator for comparing said reference frequency with the frequency of said alternator; and a potentiometer responsive to the difference in the frequency of said reference and said alternator and connected to said amplifier to provide said additional control signal.

8. In an alternator control means the combination of: a common bus; a plurality of alternators; a prime mover for and connected to drive each of said alternators, a governor driven by and controlling each prime mover; switch means connected to couple each of said alternators to said bus; a load sensing means coupled to said bus for deriving a reference signal in response to the number of alternators contributing to the current flowing in said bus; an alternator sensing means for and connected to each alternator for deriving a signal indicating the output thereof; a comparing means connected to said load sensing means and to said alternator sensing means for comparing said reference signal and said alternator signal, said comparing means in addition being connected to deliver a control signal proportional to the difference between said reference signal and said alternator signal to an amplifier; governor control means for each prime mover coupled to said amplifier and connected to control the governor of said prime mover; speed control means actuated by the speed of said prime mover and connected to deliver an additional control signal to said amplifier; said speed control means comprising: a reference frequency source; means connected to said reference frequency source and to said alternator for comparing said reference frequency with the frequency of said alternator; a potentiometer responsive to the difference in the frequency of said reference and said alternator and connected to said amplifier to provide said additional control signal; and means responsive to said governor control means and connected to provide a feedback signal to said amplifier.

9. An alternator control system for controlling the load distribution between a plurality of alternators disposed to be connected to a common bus; a load sensing means connected to said common bus to derive a reference signal which indicates the proportion of the total bus load to be supplied by each alternator; a control system for each alternator comprising: a load transformer energized by said reference signal; an alternator transformer energized by the output from said alternator; a rectifying bridge connected to said load transformer to rectify the output of said load transformer and a rectifying bridge connected to said alternator transformer to rectify the output of said alternator transformer; a polarizing transformer connected to be energized from said common bus, the output of said polarizing transformer being connected to polarize the rectifying bridges of said load and alternator transformers; the output from the rectifying bridges of said load and alternator transformers being connected to energize a common control winding of a magnetic amplifier; and the output signal of said magnetic amplifier being connected to control a governor driven by and controlling a prime mover, said prime mover being connected to said alternator.

10. An alternator control system for controlling the load distribution between a plurality of alternators disposed to be connected to a common bus; a load sensing means connected to said common bus to derive a reference signal which indicates the proportion of the total bus load to be supplied by each alternator; a control system for each alternator comprising: a load transformer energized by said reference signal; an alternator transformer energized by the output from said alternator; a rectifying bridge connected to said load transformer to rectify the output of said load transformer; a rectifying bridge connected to said alternator transformer to rectify the output of said alternator transformer; a polarizing transformer connected to be energized from said common bus, the output of said polarizing transformer being connected to polarize the rectifying bridges of said load and alternator transformers; the output from the rectifying bridges of said load and alternator transformers being connected to energize a common control winding of a magnetic amplifier; the output signal of said magnetic amplifier being connected to control a governor driven by and controlling a prime mover, said prime mover being connected to said alternator; and additional means actuated by the output signal of said magnetic amplifier for deriving a feedback signal, said feedback signal being connected to energize a second control winding on said magnetic amplifier.

11. A load sharing system for a plurality of alternators comprising: a plurality of alternators disposed to be connected to a common bus; drive means disposed to drive each of said alternators; load sensing means coupled to said bus for deriving a reference signal representing the load to be supplied by each alternator; an alternator sensing means coupled to each alternator for deriving an alternator signal indicating the load supplied by each alternator; comparing means coupled to said load sensing means and said alternator sensing means for comparing said reference signal and said alternator signal, said comparing means in addition being coupled to said drive means to control the torque supplied by said drive means to each alternator in response to the difference between said alternator and said reference signals.

12. A load sharing system for a plurality of alternators comprising: a plurality of alternators disposed to be connected to a common bus; individual drive means connected to drive each of said alternators; load sensing means coupled to said bus for deriving a reference signal representing the load to be supplied by each alternator; an alternator sensing means coupled to each alternator for deriving an alternator signal indicating the load supplied by each alternator; comparing means coupled to said load sensing means and said alternator sensing means for comparing said reference signal and said alternator signal, said comparing means in addition being coupled to deliver a control signal representing the difference between said reference and said alternator signals to a control means, said control means being coupled to said individual drive means to control the torque thereof.

13. A load sharing sysem for a plurality of alternators comprising: a plurality of alternators disposed to be connected to a common bus; individual drive means connected to drive each of said alternators; load sensing means coupled to said bus for deriving a reference signal representing the load to be supplied by each alternator; an alternator sensing means coupled to each alternator for deriving an alternator signal indicating the load supplied by each alternator; comparing means coupled to said load sensing means and said alternator sensing means for comparing said reference signal and said alternator signal, said comparing means in addition being coupled to deliver a control signal representing the difference between said reference and said alternator signals to a control means, said control means being coupled to control individual governors connected to each individual drive means, said governors being disposed to control the torque supplied by said individual drive means.

14. A load sharing system for a plurality of alternators comprising: a plurality of alternators disposed to be connected to a common bus; individual drive means connected to drive each of said alternators; load sensing means coupled to said bus for deriving a reference signal representing the load to be supplied by each alternator; an alternator sensing means coupled to each alternator for deriving an alternator signal indicating the load supplied by each alternator; comparing means coupled to said load sensing means and said alternator sensing means for comparing said reference signal and said alternator signal, said comparing means in addition being coupled to deliver a control signal representing the difference between said reference and said alternator signals to a control means, said control means being coupled to control individual governors connected to each individual drive means, said governors being disposed to control the torque supplied by said individual drive means, said governor in addition being connected to provide a feedback signal to said control means.

15. In a load distribution system of the type described including an alternator driven by individual driving means and adapted to be coupled to a common bus; a control arrangement for regulating the load supplied by said alternator to a predetermined function of the load supplied by said system comprising, reference signal means for producing a reference signal which is a function of the load supplied by said system, individual signal sensing means coupled to the alternator for providing an alternator signal which is a function of the actual load supplied by the alternator, and error sensing means coupled to said reference signal means and said individual sensing means for combining said reference and alternator signals to produce a composite regulating signal, and controller means coupled to said error sensing means and prime mover and responsive to said composite signals for controlling the driving means to regulate load supplied by the alternator.

16. In a load distribution system of the type described including an individual alternator driven by respective driving means and arranged to be coupled to a common bus; a control arrangement for regulating the load supplied by said alternator to a predeterminable proportion of the load supplied by said system comprising reference signal means for producing a reference signal which is a function of the number of alternators supplying the load and the magnitude of the load supplied by said system, individual sensing means coupled to the individual alternator for providing an alternator signal which is proportional to the actual load supplied by the alternator, and error sensing means coupled to said reference signal means and said individual sensing means and combining said reference and alternator signals to produce a composite error signal, and controller means including an amplifier for said composite error signal and coupled to said error sensing means and prime mover and responsive to said composite signal for controlling the torque of the drive means to regulate load supplied by the alternator.

17. In a load distribution system of the type described including a plurality of alternators driven by a prime mover and arranged to be individually coupled to a common bus; a control arrangement for individually regulating the load supplied by each alternator to a predetermined function of the common load supplied by said system comprising, reference signal means for producing a reference signal which is a function of the load supplied by said system and the number of alternators coupled to said common bus, individual signal sensing means coupled to said alternator for providing individual alternator signals each of which is a function of the actual load supplied by the respective alternator, and error sensing means individual to each alternator coupled to said reference signal means and said individual sensing means for combining said reference and alternator signals to produce a composite signal, and controller means coupled to said error sensing means and prime mover and responsive to said composite signal for controlling the prime mover to regulate load supplied by the alternator.

18. In a load distribution system of the type described including several stations and reference signal means for producing a reference signal which is a function of the load supplied by said stations; each station in said system including an alternator driven by a prime mover and adapted to be coupled to a common bus; a control arrangement for regulating the load supplied by said alternator to a predetermined proportion of the load supplied by said system comprising, individual signal sensing means coupled to said alternator for producing an alternator signal which is proportional to the actual load supplied by the alternator, and error sensing means coupled to said reference signal means and said individual sensing means for combining said reference and alternator signals to produce a composite signal, and controller means coupled to said error sensing means and prime mover and responsive to said composite signal for controlling the prime mover to regulate load supplied by the alternator.

No references cited.

UNITED STATES PATENT OFFICE
CERTIFICATE OF CORRECTION

Patent No. 3,067,334                          December 4, 1962

Robert C. Byloff et al.

It is hereby certified that error appears in the above numbered patent requiring correction and that the said Letters Patent should read as corrected below.

Column 3, line 9, for "connector" read -- connected --; line 71, for "alternator" read -- alternators --; column 4, line 49, after "than" insert -- that --; column 5, line 29, for "rectified" read -- rectifier --.

Signed and sealed this 4th day of June 1963.

(SEAL)
Attest:

ERNEST W. SWIDER
Attesting Officer

DAVID L. LADD
Commissioner of Patents